(No Model.)

E. C. FISHER.
STREET SWEEPER.

No. 509,303. Patented Nov. 21, 1893.

Witnesses
A. M. Blinn
James J. Cutler

Inventor
Elmendorf C. Fisher
By Thomas W. Hobday
Attorney

THE NATIONAL LITHOGRAPHING COMPANY,
WASHINGTON, D. C.

UNITED STATES PATENT OFFICE.

ELMENDORF C. FISHER, OF PORT RICHMOND, NEW YORK, ASSIGNOR TO THE UNIVERSAL STREET SWEEPING MACHINE COMPANY.

STREET-SWEEPER.

SPECIFICATION forming part of Letters Patent No. 509,303, dated November 21, 1893.

Application filed April 4, 1893. Serial No. 469,035. (No model.)

*To all whom it may concern:*

Be it known that I, ELMENDORF C. FISHER, of Port Richmond, in the county of Richmond, State of New York, have invented Improvements in Street-Sweeping Machines, of which the following is a specification.

Essentially my invention consists of a mechanism for sweeping street gutters, and of such mechanism consisting of a triangular frame pivotally connected to a vehicle axle and having sprocket-wheels at each corner engaging a suitable chain, and such chain, carrying brushes, and being moved by said sprocket-wheels actuated by the rotary movement of the vehicle wheel, and in such frame and mechanism being vertically moved on its pivotal connection aforesaid by a suitable means actuated by the king bolt of a vehicle.

Figure 1:
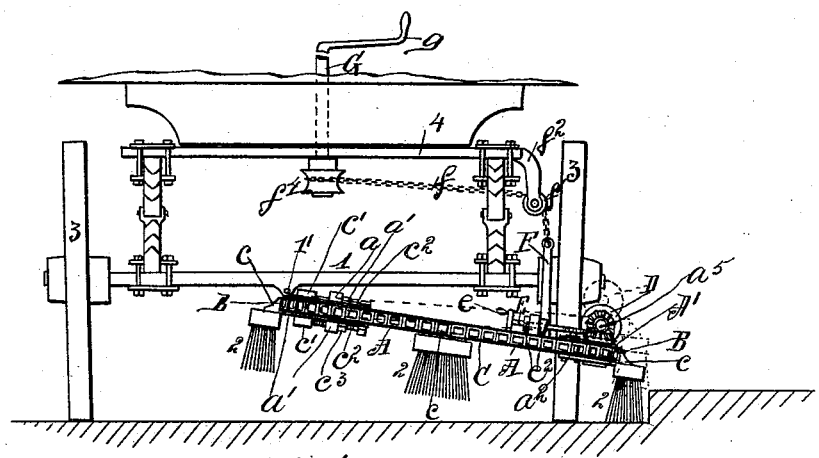
Figure 2:
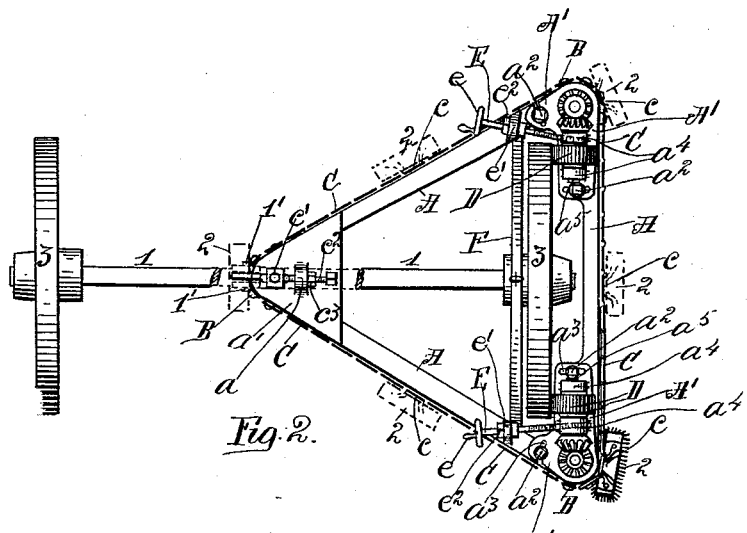
Figure 3:
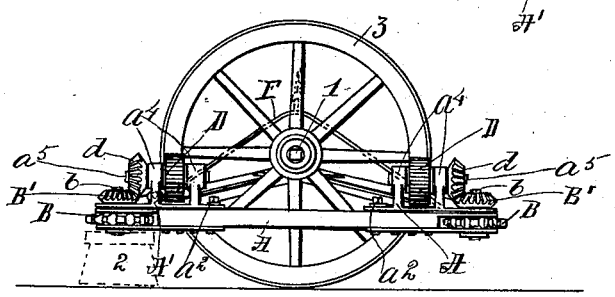

In the drawings Figure 1, is a side view of a gutter sweeping mechanism, drawn in accordance with my invention. Fig. 2, is a plan view, and Fig. 3 is an end view in detail.

(A) represents the frame, triangular in shape.

(1) denotes the vehicle axle to which the frame is pivotally connected at (1').

(B) represents the sprocket wheels which are suitably retained at each corner of the frame (A) and in such a manner as to permit the chain engaging teeth of said wheels to engage with the links of the chain (C). This chain (C) is an endless chain and has links of such a design as to efficiently carry brushes (2) of which the number as carried by said chain is optional.

(c) denotes the brush carrying links of the endless chain aforesaid. The corner or end of the frame (A) pivotally retained by the aforesaid axle, can be engaged or held in various ways; in the drawings, Figs. 1, and 2, show lugs depending from the aforesaid axle each side of a projection or trunnion near or at the upper end of the pivotally held side of said framework, and a pin passes through such trunnions whereby said parts are pivotally connected as represented by (1'). The chain wheel as retained by the held corner before mentioned, is carried on a movable bearing ($c'$) fitted in a sliding manner on the framework (A). The adjusting screws ($c^2$) pass through the projections ($a$) of the wheel plates ($a'$) and engage the movable bearing ($c'$) and are locked by the cheek nuts ($c^3$). This is to take up the slack of the endless chain (C). The other two corners of the framework outside of the vehicle wheel (3) have retaining screws ($a^2$) to rigidly hold the swinging beds (A') which have suitable openings ($a^3$) for such screws ($a^2$). These swinging beds have suitable bearings ($a^4$) for the shafts ($a^5$), upon which, are secured the friction wheels (D), and the bevel gears ($d$), that mesh with the bevel gears (B'), secured to the shaft ($b$) of the chain wheels (B). The friction wheels being thus carried on a swinging mechanism (A'), and such pivotal axis being the chain wheel shaft ($b$), said friction wheels can be made to disengage from the face of the side of the vehicle wheel and engage such at a pressure obtainable through the manipulation of the hand wheel ($e$) and threaded shaft (E) which passes through the projection ($e'$) and engages the swinging members (A'), which are retained where set by the retaining screws ($a^2$) tapped into the swinging frame (A'), and also by the threaded shaft (E) engaging corresponding threads in the swinging member aforesaid. The part of the shaft (E) that passes through the trunnion ($e'$) loosely engages such, and has two collars ($e^2$) secured thereto to prevent said shaft having a movement other than a rotary, as attained by locating said collars on said shaft each side of the aforesaid trunnion or projection ($e'$).

Having thus far described certain features of my invention, that involve a mechanism capable of transmitting motion from the vehicle wheel to brushes, I would observe before I proceed further that I do not wish to rigidly confine myself to such manner of construction of the means for actuating the brushes as described, as such can be varied without departing from the object of my invention.

To the frame (A) I secure the strap or spanner (F) each side thereof, which is designed to span over the hub or the axle of the vehicle when the brushes are in contact with the road. To this strap is connected a chain ($f$) that passes over the supporting idler ($f^3$) axially held by the arm ($f^2$) secured to the fifth wheel plate (4); and the other end of the chain ($f$) is secured to the chain drum ($f^4$) which is secured to the king-bolt of the vehicle. This king-bolt (G) acts a double purpose: first as the axis of the fifth wheel, and second as a means to wind the aforesaid chain upon its drum ($f^4$), to elevate the swinging end of the framework (A) to raise the brushes from the road. The upper end of such king bolt can be provided with any suitable means to rotate same; in the drawings, Fig. 1, shows an ordinary crank arm ($g$) to operate said king bolt to lift the swinging end of the said framework.

In the above view Fig. 1 I represent the inverted position of the swinging end of the framework by dotted lines which also illustrates another essential feature of my invention, which is, that when the above end becomes elevated from the road, that is, the brushes, the friction wheels become disengaged from the side face of the vehicle wheel and thus all movement of the brushes is immediately stopped. Hence the inclination of my framework (A) as illustrated and described is twofold in result, viz: it only permits the brushes moving on the outside of the vehicle wheel to engage the road, when so desired, and second, the movement of the brushes is stopped when the end aforesaid of the framework is raised.

Having described my invention, I claim—

1. In a sweeping machine, a gutter brush mechanism, consisting of a suitable frame surrounding the wheel of a vehicle, and being pivotally connected to the vehicle axle and having its opposite side to said connection free to swing, chain wheels retained axially by such framework one at each corner thereof, means to adjust a chain wheel so as to take up the slack of the engaging chain, friction wheels engaging the side face of the vehicle wheel, such wheels actuating the chain engaging wheels through suitable gearing, a movable portion having suitable bearings for the friction wheel and swinging on the chain wheel center, means to swing such friction wheel carrying member as to engage with, and disengage the friction wheel from, the side face of the vehicle wheel, and to retain the friction wheel where adjusted, an endless chain engaging the actuating wheels, a brush suitably retained by a link of such engaged chain, a suitable strap, a chain connected to said strap and engaging the king-bolt of the vehicle and such bolt being capable of causing the swinging end of aforesaid framework to be vertically moved through said chain and strap engaged therewith, substantially as set forth.

2. The combination with a vehicle axle, and a suitable vertically moving frame mechanism, of a three cornered frame surrounding the wheel of a vehicle, and having one corner pivotally retained by the aforesaid axle and the opposite side vertically moved by the aforesaid mechanism, suitable chain engaging gears retained by such frame, one at each corner thereof, a device for taking up the slack of the wheel engaging chain, through the wheel, friction wheels engaging the wheel of the vehicle and transmitting motion to the chain actuating gears, the shaft of the chain operating gears acting as a pivotal axis for the friction-wheel-supporting frame, such friction-wheel-supporting means having suitable bearings for the friction wheel, and engaging such axis, a threaded shaft engaging such friction wheel carrying member and the three cornered framework so as to move the said friction wheel support, devices for retaining such support, a suitable endless chain engaging such actuated chain gears, and brushes retained by the links of said chain, substantially as described.

ELMENDORF C. FISHER.

Witnesses:
GEO. W. SIAS,
H. E. LEMAN.